(12) United States Patent
Chen et al.

(10) Patent No.: US 11,626,245 B2
(45) Date of Patent: Apr. 11, 2023

(54) MANUFACTURING METHOD OF MAGNET UNIT FOR WIRELESS CHARGING

(71) Applicant: Dongguan Jinconn New Material Co., Ltd., Dongguan (CN)

(72) Inventors: Liang Chen, Dongguan (CN); Xiangyang Liu, Dongguan (CN); Song Chen, Dongguan (CN); Qianghua Lai, Dongguan (CN)

(73) Assignee: DONGGUAN JINCONN NEW MATERIAL CO., LTD., Dongguan (CN)

( * ) Notice: Subject to any disclaimer, the term of this patent is extended or adjusted under 35 U.S.C. 154(b) by 19 days.

(21) Appl. No.: 17/340,147

(22) Filed: Jun. 7, 2021

(65) Prior Publication Data
US 2022/0172888 A1 Jun. 2, 2022

(30) Foreign Application Priority Data
Nov. 30, 2020 (CN) .......................... 202011368668.3

(51) Int. Cl.
| | |
|---|---|
| H01F 7/06 | (2006.01) |
| H01F 41/02 | (2006.01) |
| H02J 50/12 | (2016.01) |
| H01F 13/00 | (2006.01) |
| H04R 1/10 | (2006.01) |

(52) U.S. Cl.
CPC ....... *H01F 41/0253* (2013.01); *H01F 13/003* (2013.01); *H02J 50/12* (2016.02); *H04R 1/1025* (2013.01); *H04R 2420/07* (2013.01)

(58) Field of Classification Search
CPC .. H01F 7/0221; H01F 13/003; H01F 41/0253; H02J 50/12; H04R 2420/07; H04R 1/1025
See application file for complete search history.

(56) References Cited

U.S. PATENT DOCUMENTS

| | | | |
|---|---|---|---|
| 6,020,736 A * | 2/2000 | Aoyama | G01D 5/147 324/207.21 |
| 9,912,168 B2 * | 3/2018 | Park | H01F 38/14 |
| 10,424,941 B2 * | 9/2019 | Park | G01R 33/07 |
| 11,018,540 B2 * | 5/2021 | Kim | H02K 11/215 |

* cited by examiner

*Primary Examiner* — Paul D Kim (57) ABSTRACT

The invention discloses a manufacturing method of magnet unit for wireless charging, including the steps: installing multiple magnetic elements onto a first carrier made of non-magnetic material; moving the first carrier into a magnetizing machine to magnetize all the magnetic elements so that each magnetic element becomes a magnet piece, an N-pole and an S-pole are formed on different portions of the same surface of the magnet piece; installing the magnet pieces onto a second carrier made of magnetically permeable material to form a magnet unit, the magnet pieces are defined in an annular array around the central axis of the second carrier installed on a wireless charging base, the magnet unit cooperates with a charging coil of the wireless charging base to charge a wireless headset. The invention simplifies the manufacturing process and ensures the consistency of magnet pieces in the same magnet unit, also improves the manufacturing efficiency.

11 Claims, 6 Drawing Sheets

```
┌─────────────────────────────────────────────────────────────────────┐
│ a spray gun is used to spray liquid insulating material on the magnetic body; │
└─────────────────────────────────────────────────────────────────────┘
                                    ↓
┌─────────────────────────────────────────────────────────────────────┐
│ a baking unit is used to dry the liquid insulating material attached to the magnetic │
│ body to form the insulating protective layer, the magnetic body and the insulating │
│ protective layer are combined to form the magnetic element; │
└─────────────────────────────────────────────────────────────────────┘
                                    ↓
┌─────────────────────────────────────────────────────────────────────┐
│ using a magnetizing machine to magnetize all the magnetic elements on the first │
│ carrier so that each magnetic element becomes a magnet piece, an N-pole and an │
│ S-pole are formed on different portions of the same surface of the magnet piece; │
└─────────────────────────────────────────────────────────────────────┘
                                    ↓
┌─────────────────────────────────────────────────────────────────────┐
│ installing all the magnet pieces onto a second carrier to form a magnet unit, the │
│ second carrier is made of magnetically permeable material; the magnet pieces │
│ carried by the second carrier are defined in an annular array around the central axis │
│ of the second carrier; │
└─────────────────────────────────────────────────────────────────────┘
                                    ↓
┌─────────────────────────────────────────────────────────────────────┐
│ the second carrier of the magnet unit is used to be installed on a wireless charging │
│ base, and the magnet unit cooperates with a charging coil of the wireless charging │
│ base to charge a wireless headset. │
└─────────────────────────────────────────────────────────────────────┘
```

MANUFACTURING METHOD OF MAGNET UNIT FOR WIRELESS CHARGING

CROSS REFERENCE TO PRIORITY APPLICATIONS

This application claims the benefit of Chinese Application 202011368668.3 for a manufacturing method of a magnet unit for wireless charging (filed Nov. 30, 2020 at the China National Intellectual Property Administration, CNIPA). The disclosures of the above applications are incorporated herein by reference.

FIELD OF THE INVENTION

The invention pertains to the field of magnet manufacturing, particularly to a manufacturing method of magnet unit for wireless charging.

BACKGROUND OF THE INVENTION

With the progress of science and technology and the development of economy and society, wireless charging is favored by more and more consumers because it does not require wires to be involved and is convenient to use. In wireless charging technology, it is necessary to provide a magnet assembly for the charging coil. The structure of the magnet assembly in the prior art is unreasonable and complicated, and the installation or disassembly of the magnet assembly is time-consuming and laborious, and it is extremely inconvenient to use. In addition, the performance of the magnets in the magnet assembly is inconsistent, which also leads to poor manufacturing of the magnet assembly.

Therefore, there is a need to invent a new equipment to solve the above-mentioned problems.

SUMMARY OF THE INVENTION

The purpose of the invention is to solve the problems in the prior art.

In accordance with an aspect of the embodiment, there is provided a manufacturing method of a magnet unit for wireless charging, it comprises the following steps: installing a plurality of magnetic elements onto a first carrier, the first carrier is made of non-magnetic material; moving the first carrier along with the magnetic elements into a magnetizing machine, using the magnetizing machine to magnetize all the magnetic elements on the first carrier so that each magnetic element becomes a magnet piece, an N-pole and an S-pole are formed on different portions of the same surface of the magnet piece; installing the magnet pieces onto a second carrier to form a magnet unit, the second carrier is made of magnetically permeable material; the magnet pieces carried by the second carrier are defined in an annular array around the central axis of the second carrier; the second carrier of the magnet unit is used to be installed on a wireless charging base, the magnet unit cooperates with a charging coil of the wireless charging base to charge a wireless headset.

In accordance with another aspect of the embodiment, there is provided a manufacturing method of a magnet unit for wireless charging, characterized in that it comprises the following steps: installing a plurality of magnetic elements onto a first carrier, the first carrier is made of non-magnetic material; moving the first carrier along with the magnetic elements into a magnetizing machine, using the magnetizing machine to magnetize all the magnetic elements on the first carrier so that each magnetic element becomes a magnet piece; installing the magnet pieces onto a second carrier to form a magnet unit, the second carrier is made of magnetically permeable material; the magnet pieces carried by the second carrier are defined in an annular array around the central axis of the second carrier; the second carrier of the magnet unit is used to be installed on a wireless charging base, the magnet unit cooperates with a charging coil of the wireless charging base to charge a wireless headset.

In accordance with another aspect of the embodiment, there is provided a manufacturing method of a magnet unit for wireless charging, characterized in that it comprises the following steps: installing a plurality of magnetic elements onto a first carrier, the first carrier is made of non-magnetic material; moving the first carrier along with the magnetic elements into a magnetizing machine, using the magnetizing machine to magnetize all the magnetic elements on the first carrier so that each magnetic element becomes a magnet piece, an N-pole and an S-pole are formed on different portions of the same surface of the magnet piece; installing the magnet pieces onto a second carrier to form a magnet unit, the second carrier is made of magnetically permeable material; the second carrier of the magnet unit is used to be installed on a wireless charging base, the magnet unit cooperates with a charging coil of the wireless charging base to charge a wireless headset.

The manufacturing method of the magnet unit for wireless charging of the present invention greatly simplifies the manufacturing process of the magnet unit, ensures the consistency of magnet pieces in the same magnet unit, and improves the manufacturing efficiency of the magnet unit.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

The invention will be further described below in details with reference to the figures and embodiments.

Figure 1:
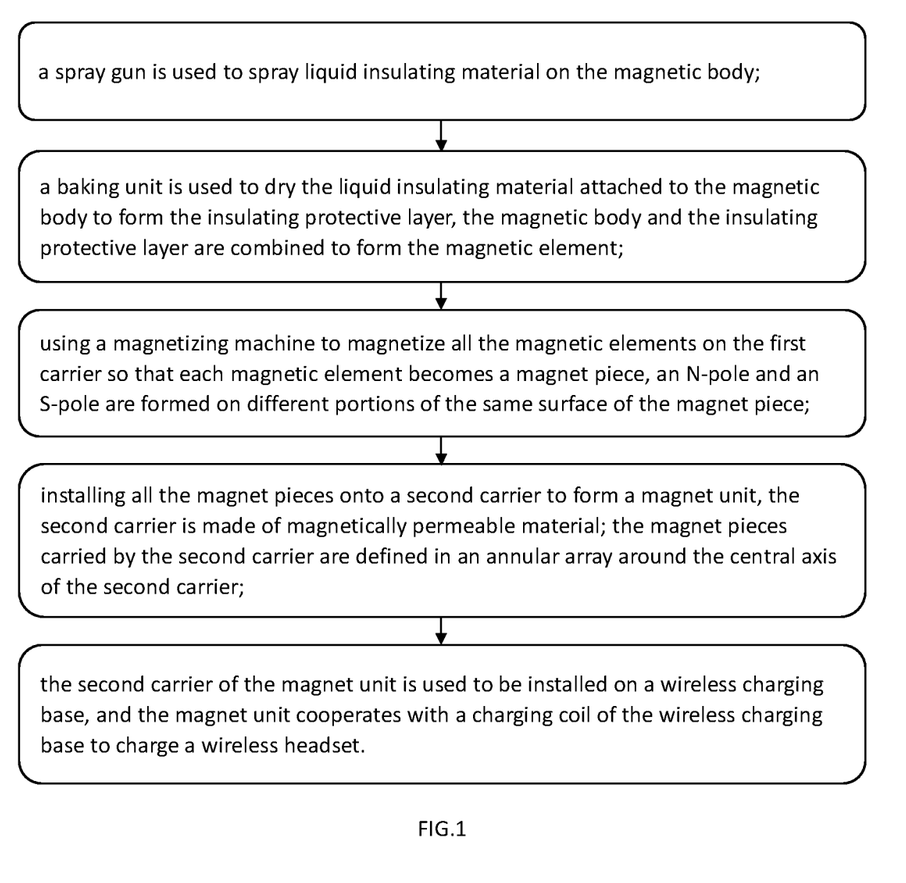
FIG. 1 is the process flow diagram of the present invention.

As shown in FIG. 1 to FIG. 6, a manufacturing method of a magnet unit for wireless charging comprises the following steps:

Installing a plurality of magnetic elements onto a first carrier, the first carrier is made of non-magnetic material;

Moving the first carrier along with the magnetic elements into a magnetizing machine, using the magnetizing machine to magnetize all the magnetic elements on the first carrier so that each magnetic element becomes a magnet piece 2, an N-pole and an S-pole are formed on different portions of the same surface of the magnet piece 2. Since the first carrier is made of non-magnetic material, in the process of magnetizing the magnetic elements on the first carrier by the magnetizing machine, the magnetism of the first carrier itself is prevented from interfering with the magnetization of the magnetic element, and the magnetization yield of the magnetic element is improved.

Figure 2:
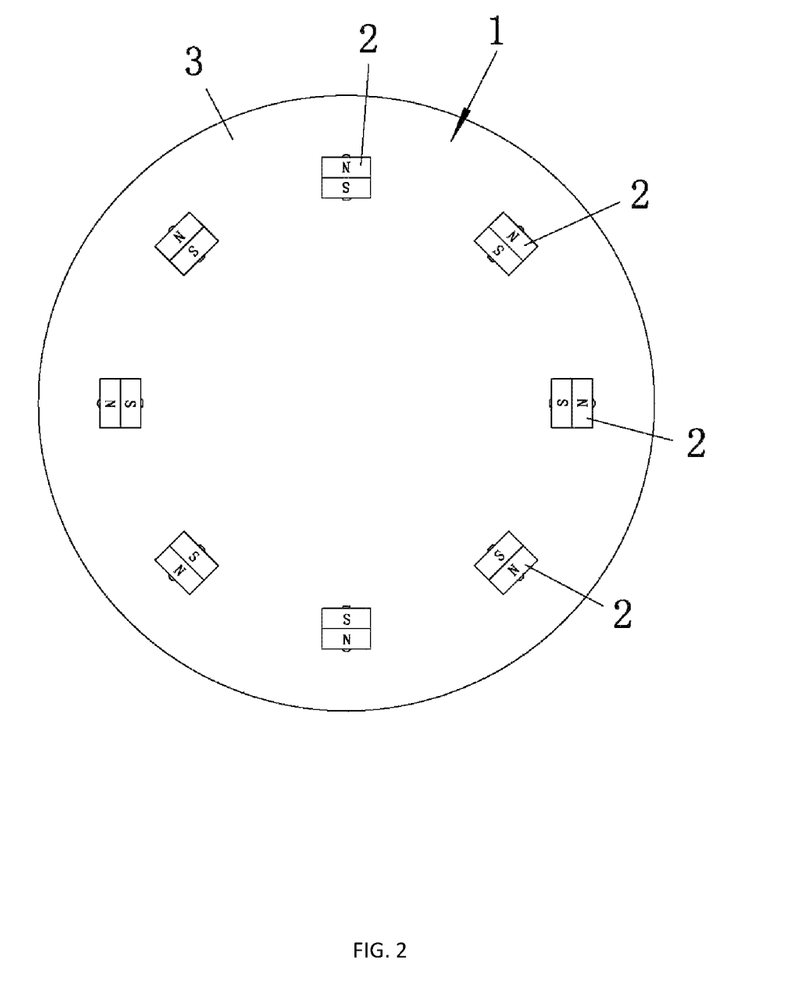
FIG. 2 is a perspective diagram of the magnet unit of the present invention.
Figure 3:
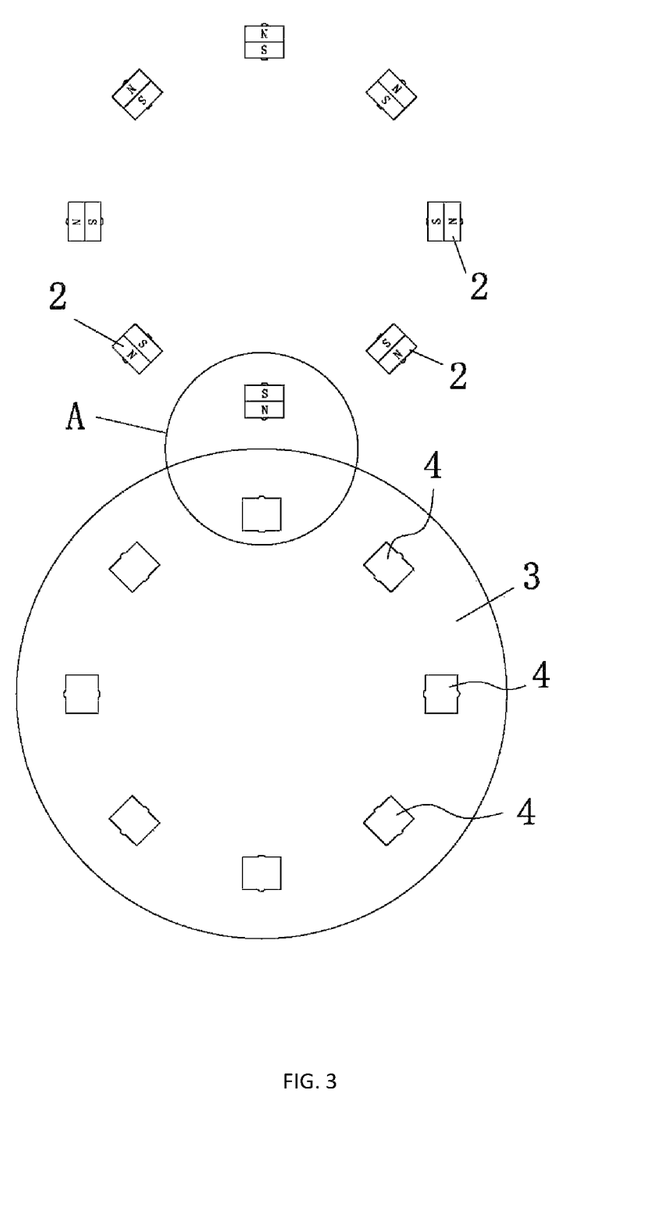
FIG. 3 is an exploded diagram of the magnet unit of the present invention.

Installing all the magnet pieces 2 onto a second carrier 3 to form a magnet unit 1, the second carrier 3 is made of magnetically permeable material; the magnet pieces 2 carried by the second carrier 3 are defined in an annular array around the central axis of the second carrier 2.

The second carrier 3 of the magnet unit 1 is used to be installed on a wireless charging base, the magnet unit 1 cooperates with a charging coil of the wireless charging base to charge a wireless headset. The second carrier 3 is combined with a plurality of the magnet pieces 2 to form the complete and independent magnet unit 1, with the cooperation of the magnet unit 1 and the charging coil on the wireless charging base, wireless charging of mobile smart terminals (for example, smart phones, tablets computers, smart watches, smart glasses, wireless headphones, etc.) is realized. When disassembling, it is only necessary to disconnect the connection between the second carrier 3 and the wireless charging base. The magnet unit 1 is quickly assembled or disassembled, which greatly improves the disassembly efficiency of the magnet unit 1.

The manufacturing method of the magnet unit for wireless charging according to the present invention greatly simplifies the manufacturing process of the magnet unit 1, all the magnet pieces 2 of the same magnet unit 1 are magnetized at one time, thus, the consistency of all the magnet pieces 2 of the same magnet unit 1 is ensured, and the manufacturing efficiency of the magnet unit 1 is improved.

Figure 4:
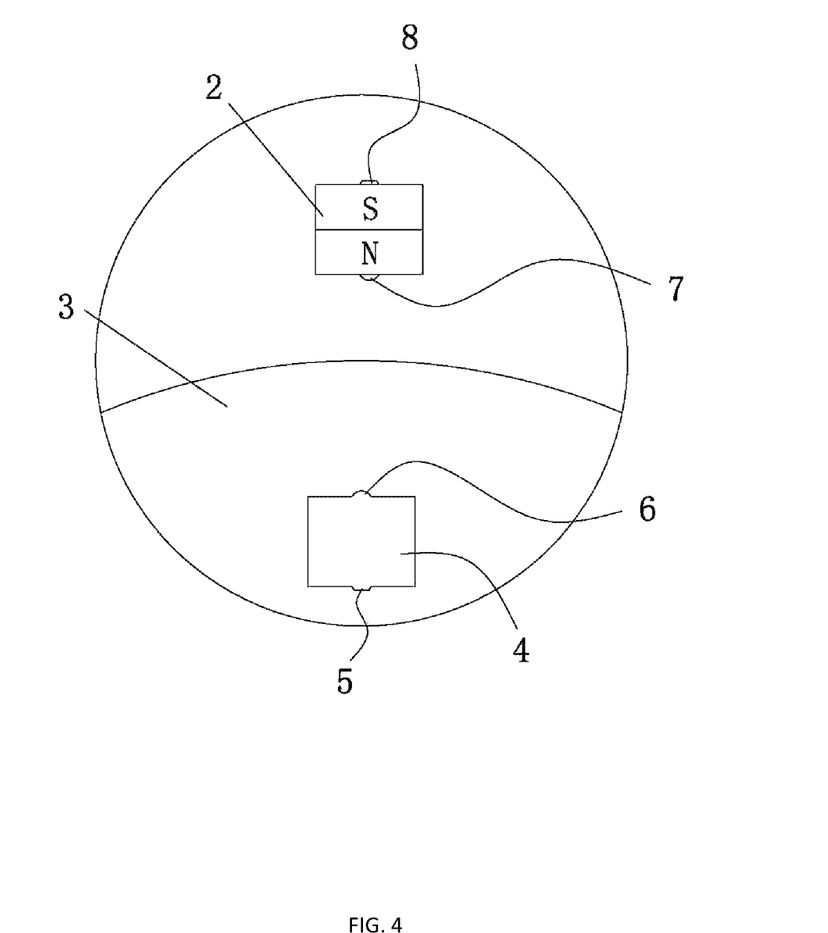
FIG. 4 is a partial enlarged schematic diagram of A in FIG. 3.

The manufacturing method of the magnet unit for wireless charging according to the present invention further includes the following step:

Machining a plurality of first grooves 4 on the second carrier 3, each magnet piece 2 is put into each first groove, each first groove 4 corresponds to each magnet piece 2 respectively, the first groove 4 and the magnet piece 2 are interference fit. The inner surface of the first groove 4 abuts against the magnet piece 2 in order to prevent the magnet piece 2 from moving relative to the second carrier 3 and being poorly used, thus, it is ensured that the magnet piece 2 is stably fixed on the second carrier 3.

The manufacturing method of the magnet unit for wireless charging according to the present invention further includes the following step:

Injecting a glue into the first groove 4, riveting the magnet piece 2 onto the second carrier 3 and located in the first groove 4, the magnet piece 2 and the second carrier 3 are adhered by the glue in the first groove 4. With the aid of the glue, the bonding strength between the magnet piece 2 and the second carrier 3 is enhanced, and the magnet piece 2 is prevented from falling off from the second carrier 3 and being used poorly. Preferably, a plurality of friction ribs is defined between the outer lateral surface of the magnet piece 2 and the inner lateral surface of the first groove 4, the friction between the magnet piece 2 and the second carrier 3 is further increased via the friction ribs, thus, they are firmly installed together.

The manufacturing method of the magnet unit for wireless charging according to the present invention further includes the following step:

Processing a first positioning notch 5 and a second positioning notch 6 on the second carrier 3, the first positioning notch 5 and the second positioning notch 6 communicate with the first groove 4, the shape of the first positioning notch 5 is different from that of the second positioning notch 6. For example, the first positioning notch 5 is trapezoidal, and the second positioning notch 6 is semicircular.

The N-pole and the S-pole are respectively provided with a first positioning protrusion 7 and a second positioning protrusion 8, the first positioning protrusion 7 and the second positioning protrusion 8 are respectively accommodated in the first positioning notch 5 and the second positioning notch 6. The shape of the first positioning notch 5 is different from that of the second positioning notch 6, The shape of the first positioning protrusion 7 matches the shape of the first positioning notch 5, and the shape of the second positioning protrusion 8 matches the shape of the second positioning notch 6. Because the shape of the first positioning notch 5 is different from that of the second positioning notch 6, the N pole and S pole of the same end of the magnet piece 2 can be quickly and accurately assembled on the second carrier 3, avoiding assembly errors of the magnet piece 2 and improving the accuracy of installation of the magnet piece 2.

The manufacturing method of the magnet unit for wireless charging according to the present invention further includes the following step:

Using a manipulator to transfer all the magnetic elements onto the first carrier at one time, the plurality of the magnetic elements carried by the first carrier are formed in a circular array around the central axis of the first carrier; using another manipulator to move and install all the magnet piece onto the second carrier 2. By using the manipulators, all the magnetic elements and all the magnet pieces 2 can be transferred at one time, which further assists in improving the manufacturing efficiency of the magnet unit 1.

The manufacturing method of the magnet unit for wireless charging according to the present invention further includes the following step:

Machining a plurality of second grooves on the first carrier, each magnetic element is accommodated in each second groove, the second groove and the magnetic element are clearance fit. That is, the inner diameter of the second groove is larger than the outer diameter of the magnetic element, so that the magnetic element can be quickly placed in the second groove.

Attaching a transparent cover on the first carrier, the transparent cover is used to seal each magnetic element in each second groove respectively. For example, the transparent cover sheet is a transparent plastic sheet, the user or a visual system can directly observe the magnetic element in the second groove via the transparent cover, so as to facilitate the detection of whether the magnetic element is missing.

Moving the first carrier and all the magnetic elements sealed by the transparent cover into the magnetizing machine for magnetization. With the help of the transparent cover, the magnetic elements on the first carrier sheet are prevented from falling and causing poor magnetization.

Figure 5:
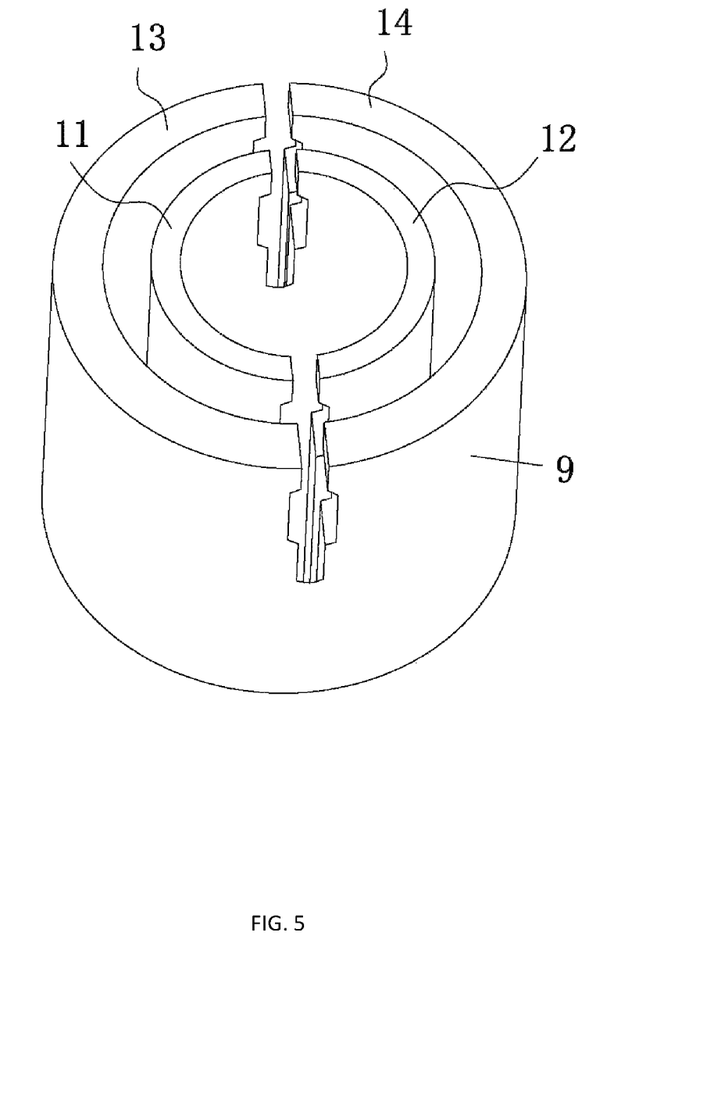
FIG. 5 is a schematic diagram of the jig element of the present invention.

The magnetizing machine includes a machine core, the machine core includes a jig unit and a magnetizing system, the jig unit includes a jig element 9 and a magnetizing coil, the jig unit 9 includes a first semi-circular arc portion 11 and a second semi-circular arc portion 12 cooperating with the first semi-circular arc portion 11, the first semi-circular arc portion 11 and the second semi-circular arc portion 12 are combined to form a first annular arc portion. The magnetizing coil includes a first magnetizing coil and a second magnetizing coil, the first magnetizing coil is sleeved on the outside of the first semi-circular arc portion 11, the second magnetizing coil is sleeved on the outside of the second semi-circular arc portion 12, the magnetizing system magnetizes a first portion of the same surface of the magnetic elements on the first carrier into the N-pole or the S-pole at a time via the first magnetizing coil and the second magnetizing coil.

The jig element 9 further includes a third semi-circular arc portion 13 and a fourth semi-circular arc portion 14 cooperating with the third semi-circular arc portion 13, the third semi-circular arc portion 13 and the fourth semi-circular arc portion 14 are combined to form a second annular arc portion; the first annular arc portion and the second annular arc portion are concentric; the magnetizing coil includes a third magnetizing coil and a fourth magnetizing coil, the third magnetizing coil is sleeved on the outside of the third semi-circular arc portion 13, the fourth magnetizing coil is sleeved on the outside of the fourth semi-circular arc portion 14, the magnetizing system magnetizes a second portion of the same surface of the magnetic elements on the first carrier into the N-pole or the S-pole at a time via the third magnetizing coil and the fourth magnetizing coil, the magnetizing coils magnetizes the same surface of the magnetic element as the N-pole and the S-pole respectively.

The first carrier is made of insulating plastic, the second carrier 3 is made of ferrite material, and the magnetic element is made of NdFeB. The magnet piece 2 is a strong magnet. The second carrier 3 is magnetically conductive, therefore, the magnetic induction line of the magnet piece 2 on the second carrier 3 cooperate with each other via the second carrier 3, furthermore, the magnet assembly is made to form a cooperative and stable magnet module, which improves the efficiency of wireless charging.

The second carrier 3 is a circular plate, preferably, the diameter of the second carrier 3 is between 20 mm and 80 mm. When the diameter of the second carrier 3 is greater than 80 mm, the second carrier 3 is easily bent and damaged; when the diameter of the second carrier 3 is less than 20 mm, wireless charging is inefficient.

The thickness of the second carrier 3 is preferably between 0.4 mm and 3.0 mm. When the thickness of the second carrier 3 is greater than 3.0 mm, the second carrier 3 will cause the magnetic field strength of the magnet piece 2 to decrease; when the thickness of the second carrier 3 is less than 0.4 mm, the strength of the second carrier 3 is too low and is easily broken.

In this embodiment, the magnet piece 2 is an independent component, that is, the magnet piece 2 is an integrated structure. The magnet piece 2 has two different polarities (N-pole, S-pole) on the same surface, that is, the magnet piece 2 is divided into two parts on the same surface, one is the N-pole and the other is the S-pole.

Based on actual needs, alternatively, the magnetic element 2 includes a first magnetic unit and a second magnetic unit that are arranged side by side and attached together, the first magnetic unit and the second magnetic unit are located on the same end of the magnet element, the first magnetic unit and the second magnetic unit respectively form the N-pole and the S-pole. At this time, the end face of the magnetic element has a single polarity.

In this embodiment, the magnetic element includes a magnetic body and an insulating protective layer covering the outer side of the magnetic body.

The manufacturing method of the magnet unit for wireless charging according to the present invention further includes the following step:

A spray gun is used to spray liquid insulating material (such as liquid epoxy resin) on the outer side of the magnetic body to form an insulating protective layer, with the high pressure spraying of the spray gun, the liquid insulating material is pre-attached on the outer side of the magnetic body.

A baking unit is used to dry the liquid insulating material attached to the magnetic body to form the insulating protective layer, the magnetic body and the insulating protective layer are combined to form the magnetic element. The insulating protective layer protects the magnetic body, therefore, the probability of damage to the magnetic body due to direct collision is reduced. At the same time, the surface properties of the magnetic body are improved. As the insulating protective layer is compact and hydrophobic, the possibility of deterioration of the magnetic body due to direct contact with water vapor in the air is reduced.

Figure 6:
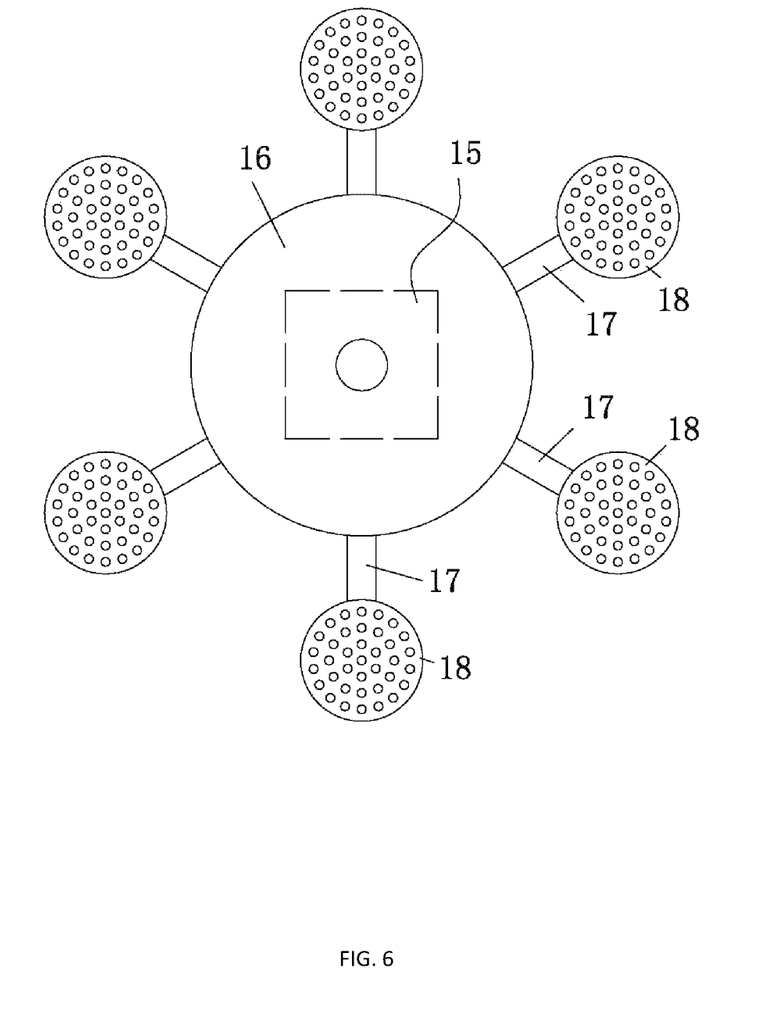
FIG. 6 is a schematic diagram of the cam divider, carrying plate, horizontal shaft and screen cage of the present invention.

Furtherly, the magnetizing machine includes a machine table, a cam divider 15, a drive motor, a carrying plate 16, a plurality of horizontal shafts 17, a first driving member, a plurality of screen cages 18, the cam divider 15 is installed on the machine table, the drive motor is used to drive an input shaft of the cam divider 15 to rotate, the carrying plate 16 is installed on an output shaft of the cam divider 15, the multiple horizontal shafts 17 are rotatably arranged on the carrying plate 16, the first driving member is arranged on the carrying plate 16 and is used to drive the multiple horizontal shafts 17 to rotate synchronously, each screen cage 18 is installed on each horizontal shaft 17, respectively. The screen cage 18 is roughly a hollow sphere structure. The drive motor drives the carrying plate 16 to rotate intermittently via the cam divider 15. The multiple horizontal shafts 17 are arranged in an annular array around the rotation axis of the carrying plate 16.

The machine table is provided with multiple isolation chambers and a second driving member, the isolation chambers are used to separate the adjacent screen cages 18, the second driving member is used to drive the isolation chamber to open or close. Preferably, the second driving member drives a door to move up and down in the vertical direction, thereby realizing opening or closing of the isolation chamber. The spray gun and the baking unit are located in different chambers.

In actual use, a plurality of the magnetic bodies is put into the screen cage 18, the first driving member drives the magnetic body in the screen cage 18 to turn over via the horizontal shaft 17, the spray gun sprays liquid insulating material on the magnetic body that is turning over in the screen cage 18. When the magnetic body in one screen cage 18 is sprayed with liquid insulating material in the isolated chamber, the magnetic body sprayed with liquid insulating material in another screen cage 18 is synchronously dried in another isolation chamber, the spraying and baking of the magnetic body are performed simultaneously, thus the manufacturing efficiency of the magnet piece 2 is improved.

The above embodiments, which are intended to enable those skilled in the art to understand the content of the disclosure and implement it accordingly, are merely for describing the technical concepts and features of the disclosure, and the scope of patent application of the disclosure cannot be defined only by the embodiments, i.e., any equivalent variations or modifications made in accordance with the spirit disclosed by the disclosure still fall within the scope of claims of the disclosure.

What is claimed is:

1. A manufacturing method of a magnet unit for wireless charging, comprising steps of:
    installing a plurality of magnetic elements onto a first carrier, wherein the first carrier is made of non-magnetic material;
    moving the first carrier along with the magnetic elements into a magnetizing machine, and using the magnetizing machine to magnetize all the magnetic elements on the first carrier so that each magnetic elements becomes a magnet piece, wherein an N-pole and an S-pole are formed on different portions of a same surface of the magnet piece; and,
    installing the magnet pieces onto a second carrier to form the magnet unit, wherein the second carrier is made of magnetically permeable material; wherein the magnet pieces carried by the second carrier are defined in an annular array around a central axis of the second carrier;
    wherein the second carrier of the magnet unit is used to be installed on a wireless charging base, wherein the magnet unit cooperates with a charging coil of the wireless charging base to charge a wireless headset.

2. The manufacturing method as set forth in claim 1, further comprising: machining a plurality of first grooves on the second carrier, wherein the magnet piece is put into each of the first grooves, wherein each of the first grooves corresponds to the magnet piece respectively, and wherein each of the first grooves and the magnet piece are interference fit.

3. The manufacturing method as set forth in claim 2, further comprising: injecting a glue into the first groove, and riveting the magnet piece onto the second carrier and located in the first groove, wherein the magnet piece and the second carrier are adhered by the glue in the first groove.

4. The manufacturing method as set forth in claim 2, further comprising: processing a first positioning notch and a second positioning notch on the second carrier, wherein the first positioning notch and the second positioning notch communicate with the first groove, wherein a shape of the first positioning notch is different from a shape of the second positioning notch, wherein the N-pole and the S-pole are respectively provided with a first positioning protrusion and a second positioning protrusion, and wherein the first positioning protrusion and the second positioning protrusion are respectively accommodated in the first positioning notch and the second positioning notch.

5. The manufacturing method as set forth in claim 1, further comprising: using a manipulator to transfer all the magnetic elements onto the first carrier at one time, wherein the plurality of the magnetic elements carried by the first carrier are formed in a circular array around the central axis of the first carrier; and using another manipulator to move and install all the magnet pieces onto the second carrier.

6. The manufacturing method as set forth in claim 5, further comprising: machining a plurality of second grooves on the first carrier, each of the magnetic elements is accommodated in each of the second grooves, each of the second grooves and each of the magnetic elements are clearance fit; attaching a transparent cover on the first carrier, wherein the transparent cover is used to seal each magnetic element in each second groove respectively; and moving the first carrier and all the magnetic elements sealed by the transparent cover into the magnetizing machine for magnetization.

7. The manufacturing method as set forth in claim 1, wherein the magnetizing machine includes a machine core, wherein the machine core includes a jig unit and a magnetizing system, wherein the jig unit includes a jig element and a magnetizing coil, wherein the jig unit includes a first semi-circular arc portion and a second semi-circular arc portion cooperating with the first semi-circular arc portion, wherein the first semi-circular arc portion and the second semi-circular arc portion are combined to form a first annular arc portion, wherein the magnetizing coil includes a first magnetizing coil and a second magnetizing coil, wherein the first magnetizing coil is sleeved on an outside of the first semi-circular arc portion, wherein the second magnetizing coil is sleeved on an outside of the second semi-circular arc portion, wherein the magnetizing system magnetizes a first portion of the same surface of the magnetic elements on the first carrier into the N-pole or the S-pole at a time via the first magnetizing coil and the second magnetizing coil.

8. The manufacturing method as set forth in claim 7, wherein the jig element further includes a third semi-circular arc portion and a fourth semi-circular arc portion cooperating with the third semi-circular arc portion, wherein the third semi-circular arc portion and the fourth semi-circular arc portion are combined to form a second annular arc portion, wherein the first annular arc portion and the second annular arc portion are concentric, wherein the magnetizing coil includes a third magnetizing coil and a fourth magnetizing coil, wherein the third magnetizing coil is sleeved on an outside of the third semi-circular arc portion, wherein the fourth magnetizing coil is sleeved on an outside of the fourth semi-circular arc portion, wherein the magnetizing system magnetizes a second portion of the same surface of the magnetic elements on the first carrier into the N-pole or the S-pole at a time via the third magnetizing coil and the fourth magnetizing coil, wherein the magnetizing coils magnetizes the same surface of the magnetic element as the N-pole and the S-pole respectively.

9. The manufacturing method as set forth in claim 1, wherein the first carrier is made of insulating plastic, wherein the second carrier is made of ferrite material, and the magnetic element is made of NdFeB.

10. The manufacturing method as set forth in claim 1, wherein the magnetic element includes a first magnetic element and a second magnetic element attached together, and the first magnetic element and the second magnetic element respectively form the N-pole and the S-pole.

11. The manufacturing method as set forth in claim 1, further comprising: machining a plurality of first grooves on the second carrier, wherein each the magnet piece is put into each of the first grooves, each of the first grooves corresponds to the magnet piece respectively, and each of the first grooves and the magnet piece are interference fit; and processing a first positioning notch and a second positioning notch on the second carrier, wherein the first positioning notch and the second positioning notch communicate with the first groove, wherein a shape of the first positioning notch is different from a shape of the second positioning notch; wherein the N-pole and the S-pole are respectively provided with a first positioning protrusion and a second positioning protrusion, and the first positioning protrusion and the second positioning protrusion are respectively accommodated in the first positioning notch and the second positioning notch.

* * * * *